Oct. 8, 1935.                    E. H. LANGE                    2,016,864
                        AUTOMOBILE CONTROL MECHANISM
                            Filed Sept. 26, 1933
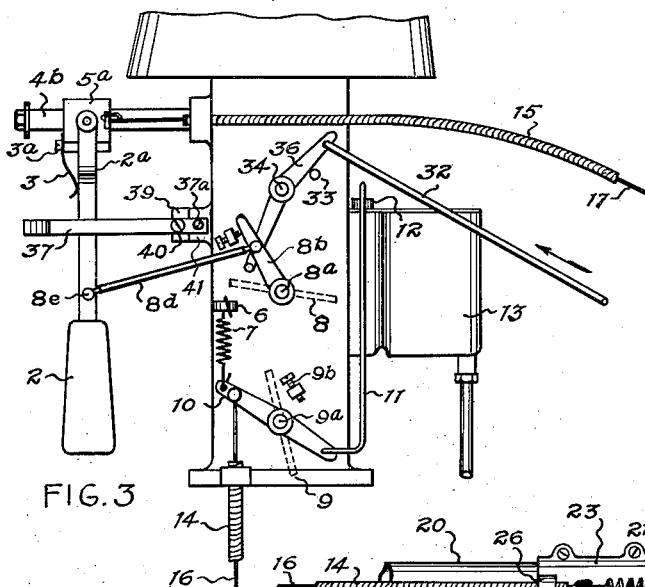
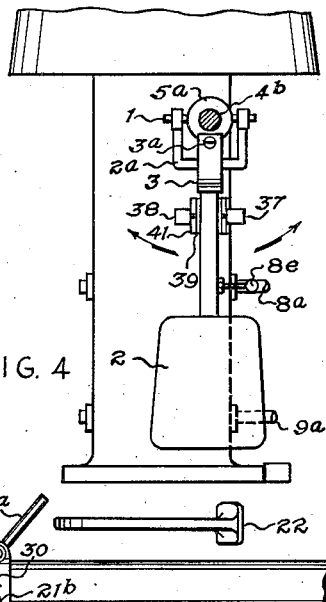
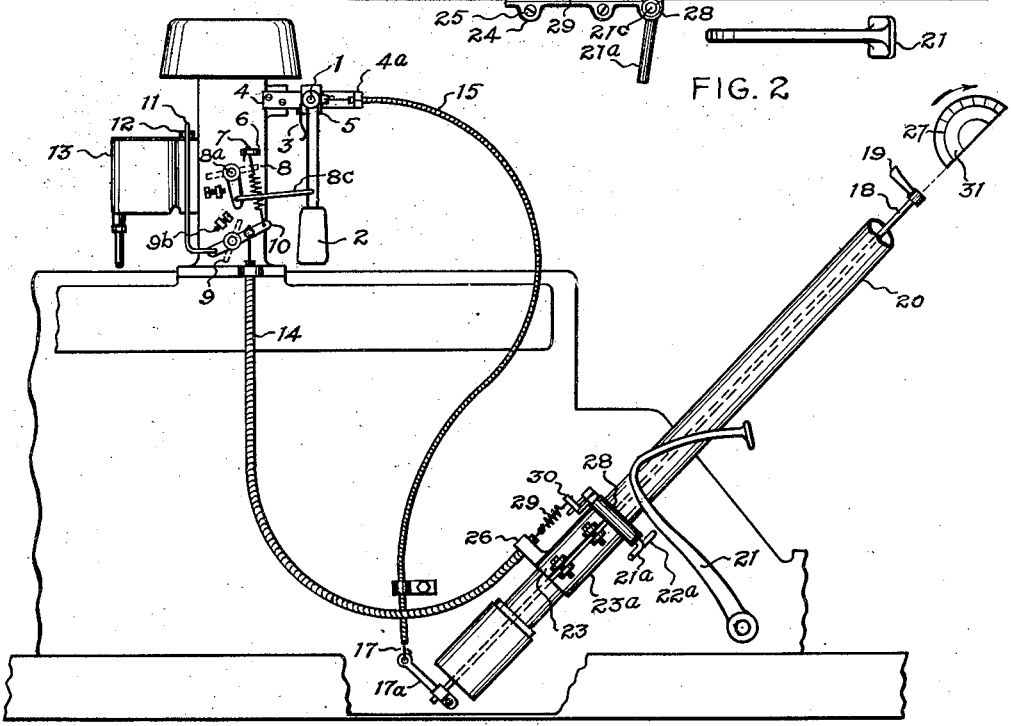
WITNESSES:                                              INVENTOR.
B. A. Greene                                            Edward H. Lange
E. G. Slagle Patented Oct. 8, 1935

2,016,864

UNITED STATES PATENT OFFICE 2,016,864

AUTOMOBILE CONTROL MECHANISM

Edward H. Lange, Baltimore, Md.

Application September 26, 1933, Serial No. 691,070

17 Claims. (Cl. 192—.01)

This invention relates to an automatic accelerator and power control mechanism for automobiles controllable by the brake control member or the clutch control member, and the object of this invention is to provide certain improvements in devices of this character as subsequently described, and with reference for example, to U. S. Patents Numbers 1,861,018 and 1,915,099 of the present inventor.

In a device of the type referred to, advantageous features are the automatic acceleration and power control obtained by means of the pendulum and connected controls. The principal object of this invention is to retain the important features of automatic acceleration and power control and to provide substantial improvements in the mechanism whereby a number of features detrimental to the best performance and application of the device to any automobile are removed, and whereby the resultant device is not only simpler in structure and more readily applied but also superior in performance.

Among the other objects of this invention are the use of a secondary throttle valve, and the use of a control unit readily mountable upon the steering-post of an automobile for controlling the secondary throttle valve, thereby eliminating the direct action upon the pendulum by the clutch control or brake control members which is especially undesirable where relatively heavy pendulums are required, and at the same time eliminating undesirable geometrical factors involved in the control of the pendulum mechanism directly by the clutch or brake control members. The frictional loss in such linkages together with the additional loss contributed by the piston device upon the carburetor for supplying a temporary flow of fuel during the period of acceleration requires a relatively heavier pendulum than would otherwise be necessary, and in this invention the piston mechanism for supplying a temporary flow of fluid to the engine is connected to the secondary throttle valve. The resultant pendulum mechanism required for operation of the primary throttle valve is therefore less massive and the linkage much simpler. Another important feature of this invention is the simple means for providing a restraint upon the closure of the primary throttle valve without placing any restraint upon the further opening of the valve, and the simple and effective means for selectively setting the primary throttle valve. A further object of this invention is to provide means for reducing the flow of engine-motive fluid to the engine automatically in relation to the amount of curvature of the path of travel of the automobile, thereby greatly reducing the extent to which the brake control member need be used in slowing down upon curves of the road. These and other objects will be apparent by reference to the accompanying description, to the accompanying claims, and to the drawing.

In the drawing, Fig. 1 shows a complete assembly of mechanism, including the control unit, the primary throttle valve, secondary throttle valve, pendulum, and means for selectively setting the opening of the primary throttle valve, no compensating means for curvature of the path of the automobile being shown in this figure. Figure 2 shows a plan view of the control unit mounted upon the steering-post, and the relative positions of the brake and clutch control members. Figures 3 and 4 show the mechanism for compensating for the curvature of the path of travel of the automobile in relation to the flow of engine-motive fluid.

Referring to Figures 1 and 2, the control unit is shown, the lower section 23a and upper section 23 being clamped around the steering-post and firmly held by means of screws through the lugs shown, as for example at 25 and 24. The upper section of the control unit carries the projection 26 and the bearing members on either side of the steering-post, one of which is shown at 28. The steering-post 20 is shown between the clutch control member 21 and the brake control member 22. The control member 21a consists of a right-angle bend of rod, the portion 21c serving as a shaft within the bearing 28, and the portion 21a serving as a projection to engage the clutch control member 21. In similar manner the projection 22a is arranged to engage the brake control member and to be supported in a bearing similar to 28. The lever 21b is fastened to 21c by means of a set-screw not shown, or by a pinch joint in a manner well understood, so that the position of 21a is adjustable with reference to 21b, and in similar manner the lever 22b is connected to 22a. The lever 21b carries the projection 30 connected to which is the spring 29, and the lever 22b is arranged to engage the projection 30, so that displacement of either 22a or 21a to the left displaces the spring 29 to the right. A cable 14 is fastened at one end within the projection 26 by a pinch joint not shown, and within the cable is the loosely fitting slide-wire 16, the cable opening being sufficiently larger than the wire diameter so that the cable serves only as a guide for the slide-wire, without substantial friction upon the slide-wire. One end of the slide-wire 16 is connected to the spring 29 as shown, the other end being operatively connected to the secondary valve 9, as shown. At 9 is shown a secondary throttle valve operatively connected with the lever 10. The valve 9 is normally held in an open position by means of the spring 7 connected between the lug 6 and the lever 10. At 13 is shown the carburetor reservoir and at 12 a piston for ejecting a temporary flow of engine-motive fluid to enable ample power for accelerating purposes. The link 11 is operatively connected between 12 and the lever 10 as shown, so that the necessary force for displacing the piston 12 is provided by the spring 7 when opening the secondary throttle valve 9, upon release of the clutch or brake control members. At 8 is the primary throttle valve, the shaft 8a which carries the throttle 8 being operatively connected by the link 8c to the pendulum 2 as shown. The pendulum is pivoted at 1 upon the slidable member 5 which is supported by the support member 4 fastened to the carburetor. Fixed to the slidable member 5 is the spring 3 which engages the pendulum when the pendulum is suspended in a vertical position normal to the support 4. The purpose of the spring 5 is to accomplish several important functions. Firstly, when the primary throttle valve is nearly closed, a small motion of the pendulum due for example to irregular motion of the automobile, causes a relatively large percentage change of throttle opening which is undesirable, and this is eliminated by the resistance of the spring 3 which prevents closure of the throttle 8 beyond a set minimum. Secondly, upon down-grade the compression of the engine tends to slow down the automobile, and without restraint upon the closure of the throttle a nearly constant speed setting cannot be attained. Thirdly, with this arrangement the primary throttle valve is not constrained to maximum closure upon application of the brakes or upon disengagement of the clutch as is the case when the clutch or brake control members act directly upon the primary throttle valve. This feature not only obviates the necessity of a yieldable link at 8c, but eliminates the necessity of relatively more massive pendulums to insure sensitive response in opening the primary throttle valve upon up-grade or upon release of the clutch or brake control members, because of the relatively larger moment required to move the throttle away from a nearly closed or idling position occasioned by reaction of the fluid flow in this position of the valve upon an otherwise balanced valve. The slidable member 5 is understood to have a rectangular hole running longitudinally through the member which fits closely upon the support member 4 having a rectangular section, so that in this instance the pendulum 2 is restrained from transverse lateral displacement occasioned by curvature of the path of travel of the automobile. The support member 4 has a right-angle bend at 4a which provides a pinch joint for supporting the cable 15, in a manner well understood. Within the cable 15 is a slide-wire 17 which is operatively connected at one end to the slidable member 5 and at the other end to the arm 17a. The arm 17a is fastened to the rod 18 which passes through the steering-post and terminates in the control lever 19 which can be turned over a dial such as that shown at 31. An important feature of this mechanism is the effective means for positively disengaging the automatic power control device when manual control of the engine power is desired, for example by the use of the usual foot accelerator. For simplicity of illustration, the foot accelerator mechanism is omitted in Fig. 2, however it is understood that a foot accelerator mechanism such as that shown in Fig. 3 at 32, 34, and 36 for selectively opening the primary throttle valve 8 is provided. The normal or zero position of the automatic control is adjusted to be at 27 upon the dial 31. Clockwise rotation of the control lever 19 as shown by the arrow, provides a setting of the primary throttle opening in excess of the idle position of the throttle. When however the control lever 19 is rotated in a counter-clockwise direction, the slidable member is forced to the extreme left upon the support member, and the engine will run idle even upon a substantial grade if desired, that is, if the car is at rest and the engine running, it is not necessary to hold out the clutch or brake control member in order to have the engine run at idle power upon an up-grade for example.

The tension of the spring 7 is sufficient to open the secondary throttle valve 9 and to restore the control member 21a to its normal position upon release of the clutch or brake control member. The stop-screw 9b is provided for setting the minimum opening of the valve 9. The spring 29 is of sufficiently greater stiffness than the spring 7, so that substantial flexure of the spring 29 can take place only after the valve 9 has reached its limit of closure as fixed by the screw 9b, and the purpose of this spring is to permit further travel of the control members 21a or 22a after closure of the valve 9.

Referring to Figures 3 and 4, the mechanism for compensating for the curvature of the path of travel of the automobile in relation to the engine power is shown. In this instance, the support member 4b has a circular section and the slidable member 5a has a circular opening closely fitting over the support member. The mechanism is otherwise similar to that of Fig. 2 described, except that the pendulum in this instance pushes the primary throttle valve 8 upon up-grade instead of pulling the valve open. The linkage between the pendulum 2 and the arm 8b consists of the link 8d and the ball swivel joints at the ends of the link, as for example the extension 8e. The ball swivel joints are of a variety commonly used in automotive linkages, and well understood. Lateral displacement of the pendulum in the transverse direction can take place when the automobile is traveling in a curved path, and such displacement decreases the opening of the primary throttle valve. In order to limit the lateral displacement so established, the spring members 37 and 38 are provided on either side of the pendulum mechanism, however, there is ample clearance so that the displacement must exceed an adjustable minimum before engagement of the pendulum and springs takes place. The spring 3 is fastened to the slidable member by means of the screw 3a, and the springs 37 and 38 are fastened to the support 41 by screws, as for example by 37a. The support 41 has a ledge such as 39 on either side, so that this portion of the support 41 is of smaller width than the remaining portion. By means of screws such as 40, the springs 37 and 38 can be adjusted in relation to the pendulum. In Fig. 3 the direction of the transverse lateral displacement is shown by the arrows. The rod 32 is understood to be connected with a foot accelerator in a manner commonly used. By means of the lever 36 which turns about the pivot 34 the throttle 8 can be selectively opened. The stop 33 limits the lever 36 under the tension of a spring commonly provided for returning the foot accelerator to its normal position.

In operation the automatic power control is selective. If manual control of the power is desired, the control 19 is moved to the left of the position 27, and the foot accelerator is used. If automatic power control is desired, the control 19 is set for the maximum speed desired. In starting, as the clutch is engaged by means of the clutch control member the secondary throttle valve is opened, and acceleration of the automobile provides a further opening of the primary throttle valve as the car moves forward and the pendulum swings backward relative to the automobile. The position of the member 21a is adjustable with reference to the clutch control member, so that maximum smoothness of starting can be attained. When it is desired to slow down, it is only necessary to press lightly upon the brake control member, without actually applying the brakes. If complete stoppage is desired the brakes can be applied, and if it is desired to continue on, it is only necessary to release the brake control member to obtain automatic acceleration when the automobile has not been too greatly slowed down to require shifting of the transmission mechanism.

By means of the control unit which contains the control members 21a and 22a, the application of this device to automobiles having a variety of dimensional and structural differences is greatly facilitated.

While the application of this invention has been illustrated in one instance, it is obvious that changes can be made in the construction and arrangement of parts without departing from the spirit of my invention as further set forth in the appended claims, and I do not limit myself to the form or arrangement shown.

What is claimed is:

1. In an automobile having a clutch control member, a brake control member, a steering-post between said members, and an engine-motive fluid controller having a primary throttle valve and a mechanism for supplying a temporary flow of engine-motive fluid, a pendulum mechanism, a control unit, and a secondary throttle valve, said secondary throttle valve being operatively connected to said mechanism for supplying a temporary flow of engine-motive fluid and having spring means for normally maintaining said valve in an open position, said control unit being readily mountable upon the steering-post and having control means connected with the secondary throttle valve for selectively closing said valve in displacement relation to the clutch control member or the brake control member, and said pendulum mechanism comprising a support member, a slidable member upon said support member selectively slidable while the automobile is in motion, a pendulum pivoted to the slidable member and operatively connected to the primary throttle valve, spring means between the slidable member and said pendulum restraining the closure of the primary throttle valve, and means for selectively displacing the pendulum angularly.

2. In combination with claim 1, adjustable means for restraining the transverse lateral displacement of the pendulum, and for controlling the amount of closure of the primary throttle valve in response to the curvature of the line of travel of the automobile.

3. In an automobile having a clutch control member, a brake control member, a steering-column between said members, and an engine-motive fluid controller with a primary throttle valve and means for supplying a temporary flow of engine-motive fluid, the combination of a secondary throttle valve operatively connected with said means and having a spring normally maintaining said secondary throttle valve in an open position, a control unit readily mountable upon said steering-column for controlling the closure of said secondary throttle valve by the brake control member or the clutch control member, and a pendulum operatively connected with the primary throttle valve.

4. In an automobile, in combination with an engine-motive fluid controller having a primary throttle valve and means for supplying a temporary flow of engine-motive fluid, a secondary throttle valve, means for normally maintaining said secondary throttle valve in an open position, a control unit having means for controlling said secondary throttle valve by the clutch control member or the brake control member of the automobile, and an operative connection between the secondary throttle valve and said means for supplying a temporary flow of engine-motive fluid.

5. In combination with claim 4, an inertia-motive governor operatively connected with the primary throttle valve, said governor being responsive to the forward and rearward acceleration and inclination of the automobile to a level plane.

6. In combination with claim 4, an inertia-motive governor operatively connected with the primary throttle valve, said governor being responsive to the forward and rearward acceleration and inclination of the automobile to a level plane, and having means responsive to the curvature of path of travel of the automobile for decreasing the opening of said primary throttle valve.

7. In an automobile having a brake control member, a clutch control member, a steering-post between said members, and an engine-motive fluid controller having a throttle valve, a control unit readily mountable upon said steering-post, said control unit having a control means operatively connected with said throttle valve for closing said valve, a first control member and a second control member operatively connected with said control means, said first control member being separately adjustable in displacement relation to said clutch control member, and said second control member being separately adjustable in displacement relation to said brake control member.

8. In an automobile having a brake control member, a clutch control member, a steering-post between said members, and an engine-motive fluid controller having a primary throttle valve manually controllable for controlling the engine motive-fluid, a secondary throttle valve, means for normally maintaining said secondary throttle valve in an open position, and a control unit readily mountable upon said steering-post, said control unit having a control means operatively connected with said secondary throttle valve for closing said valve, a first control member, a second control member, each of said members operatively connected with said control means, said first control member being separately adjustable in displacement relation to said clutch control member, and said second control member being separately adjustable in displacement relation to said brake control member.

9. In combination with claim 8, a mechanism having means for supplying a temporary flow of engine-motive fluid, and an operative connection between said mechanism and said secondary throttle valve.

10. In combination with claim 8, an inertia-motive governor connected with the primary throttle valve, said inertia-motive governor having slidable means for controlling selectively the normal opening of the primary throttle valve while the automobile is in motion, and means for proportionally restraining the closure of the primary throttle valve upon down-grade, in relation to the amount of down-grade.

11. In combination with claim 8, an inertia-motive governor connected with the primary throttle valve, said governor having slidable means for selectively controlling the normal opening of the primary throttle valve, spring means for restraining the closure of the primary throttle valve upon down-grade and for steadying the position of the governor, and having means responsive to the curvature of the line of travel of the automobile for reducing the opening of the primary throttle valve.

12. In an automobile having a clutch control member, a brake control member, and an engine-motive fluid controller with a primary throttle valve controllable by a pendulum mechanism, a secondary throttle valve, said secondary throttle valve having connected means operable by and separately adjustable to the brake control member and the clutch control member for closing said secondary throttle valve, and means for normally maintaining said secondary throttle valve in an open position.

13. In an automobile having a clutch control member, a brake control member, a carburetor with a primary throttle valve and piston means for displacing a temporary supply of fuel, a secondary throttle valve for controlling the flow of engine-motive fluid, an operative connection between said secondary throttle valve and said piston means, means connected with said secondary throttle valve operable by said clutch control member or said brake control member, and means for maintaining said secondary throttle valve in a normally open position.

14. In an automobile, in combination, a clutch control member, a brake control member, an engine-motive fluid controller having a primary throttle valve, a normally open secondary throttle valve and means for supplying a temporary flow of engine-motive fluid controllable by said secondary throttle valve, means controllable by said brake control member or said clutch control member for closing the secondary throttle valve, and a pendulum mechanism operatively connected with said primary throttle valve, said mechanism having means for controlling said primary throttle valve in response to the forward or rearward inclination of the automobile to a level plane and in response to curvature of the path in which the automobile travels.

15. In an automobile having a clutch control member, a brake control member, and an engine-motive fluid controller having a primary throttle valve, the combination of a secondary throttle valve in said engine-motive fluid controller, means for normally maintaining said secondary throttle valve in an open position, a control unit operatively connected with said secondary throttle valve having means displaceable by said clutch control member or said brake control member for closing said secondary throttle valve, and a pendulum operatively connected with said primary throttle valve.

16. In combination with claim 15, means associated with said pendulum for reducing the opening of said primary throttle valve in relation to the speed of the automobile upon a curved path, and in relation to the curvature of said path.

17. In an automobile having a clutch control member, a brake control member, and an engine-motive fluid controller having a primary throttle valve and piston means for displacing a temporary flow of engine-motive fluid, the combination of a secondary throttle valve in said engine-motive fluid controller, means for normally maintaining said secondary throttle valve in an open position, an operative connection between said piston means and said secondary throttle valve, a control unit operatively connected with the secondary throttle valve having means displaceable by the clutch control member or the brake control member for controlling the opening of the secondary throttle valve, and a pendulum operatively connected with the primary throttle valve, responsive to the acceleration, the grade, and the curvature of the path of travel of the automobile.

EDWARD H. LANGE.